United States Patent
Bruggeman et al.

(10) Patent No.: US 7,739,878 B2
(45) Date of Patent: Jun. 22, 2010

(54) METHOD FOR THE CRYOGENIC COOLING OF POWDERS USING AN EARLY CONTROL STRATEGY

(75) Inventors: Beny Bruggeman, Gent-Wondelgem (BE); Robert Taylor, Wavre (BE)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 783 days.

(21) Appl. No.: 11/447,207

(22) Filed: Jun. 5, 2006

(65) Prior Publication Data

US 2006/0288712 A1 Dec. 28, 2006

(30) Foreign Application Priority Data

Jun. 9, 2005 (FR) .................................. 05 51552

(51) Int. Cl.
*F25D 17/02* (2006.01)
(52) U.S. Cl. .................................. 62/64; 62/56; 62/374
(58) Field of Classification Search .................. 62/64, 62/56, 373, 374, 375, 376, 185; 34/401, 34/428, 429
See application file for complete search history.

(56) References Cited

U.S. PATENT DOCUMENTS

| 3,611,745 | A | * | 10/1971 | Schlemmer ................. 62/333 |
| 3,889,488 | A | | 6/1975 | Maeda et al. |
| 5,156,008 | A | * | 10/1992 | Olsson et al. .................. 62/63 |
| 5,299,426 | A | | 4/1994 | Lermuzeax |
| 5,454,232 | A | | 10/1995 | Lermuzeaux et al. |
| 5,526,652 | A | * | 6/1996 | Mantovan ..................... 62/374 |
| 5,813,237 | A | * | 9/1998 | Grace et al. .................. 62/52.1 |
| 6,007,859 | A | * | 12/1999 | Taylor et al. ................. 426/302 |
| 6,497,106 | B2 | | 12/2002 | Lang et al. |
| 7,171,815 | B2 | * | 2/2007 | Pathier et al. .................. 62/63 |
| 2006/0196194 | A1 | * | 9/2006 | Bruggeman et al. ............ 62/64 |

FOREIGN PATENT DOCUMENTS

| EP | 0 505 222 | | 9/1992 |
| EP | 0 987 506 | | 3/2000 |
| FR | 2 853 403 | | 10/2004 |
| WO | WO 2004092668 | A1 * | 10/2004 |

OTHER PUBLICATIONS

French Search Report for FR 0551552.

* cited by examiner

*Primary Examiner*—Cheryl J Tyler
*Assistant Examiner*—Justin Loffredo
(74) *Attorney, Agent, or Firm*—Christopher J. Cronin; Patricia E. McQueeney

(57) ABSTRACT

A method is provided for cooling a powder in a tunnel with a vibrating support with at least two independently controllable cryogenic liquid inflows into the tunnel. It includes the following steps. A thermal mass of powder entering the tunnel is determined. The arrival of the powder at the tunnel inlet is detected. The thermal mass measurement previously obtained is synchronized with the detection of the arrival of the powder at the tunnel inlet, according to a known or predefined response time of the means for controlling the said cryogenic liquid inflows into the tunnel. The synchronization data is transmitted to a data acquisition and processing unit, which is able to retroact, if necessary, on the basis of this data, on all or part of the parameters governing the operation of the tunnel. The method is especially applicable to the cooling or deep-freezing treatments of food products or chemicals.

6 Claims, 1 Drawing Sheet

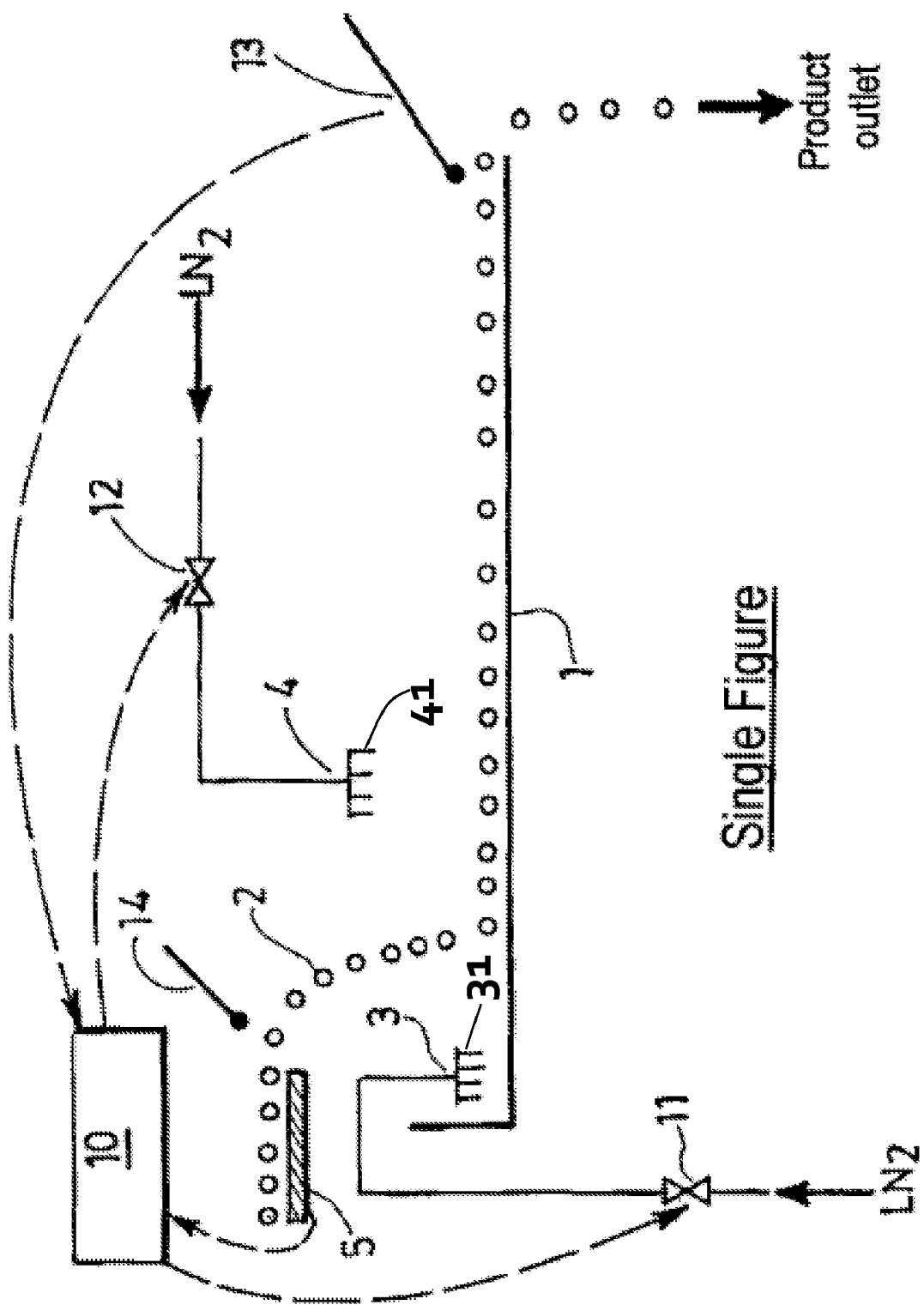

METHOD FOR THE CRYOGENIC COOLING OF POWDERS USING AN EARLY CONTROL STRATEGY

This application claims the benefit of priority under 35 U.S.C. §119 (a) and (b) to French Application No. 0551552, filed Jun. 9, 2005, the entire contents of which are incorporated herein by reference.

BACKGROUND

The present invention relates to the field of methods and installations for the cryogenic treatment of products, particularly foods or chemicals, the treatments concerned being in particular the cooling or deep-freezing treatments. It relates in particular to the treatments for cooling certain very fine powders, for the purpose of stabilizing the crystalline structure obtained at the outlet of the powder preparation method situated upstream.

The cryogenic cooling of very fine powders (typically 10 μm to 2 or 3 mm in size) typically occurs in the case of powders with a high fat content (occurring, for example, in soups, dairy products, sauces, chocolate-based preparations, etc.) or in certain chemical applications such as detergent powders.

In general, the upstream method for producing such powders delivers powders of which the temperature is relatively high, commonly between 25° C. and 50° C., temperatures at which the fat composition is in the liquid or semi-liquid/semi-crystallized state.

Under these conditions, cooling is necessary to crystallize the fats and thereby stabilize the structure of the powder.

It is preferable to effect this crystallization in an arrangement in which the powder particles are in motion, in order to prevent caking.

According to the work done by the applicant, cooling tunnels with "vibrating supports" can offer an advantageous solution to the technical problems listed above.

In document EP-A-505 222, the applicant had already proposed a novel concept of a method for freezing food products, in which the product is contacted with a refrigerating surface, created by the use of a vibrating support and a liquefied gas, the refrigerating surface consisting of a film of liquefied gas arranged on the support.

According to this prior art method, the products, even very sticky, never adhere to the support, despite a film thickness that may be very low, and it is in fact estimated that, in all probability, the product thus treated floats on the surface of the film of liquefied gas by a heating mechanism, and is turned over regularly in this film, thereby obviating any risk of adhesion to the support. Typically, this type of system operates as follows: a large quantity of liquid nitrogen is injected into the tank, which is, for example, in a gently rising slope configuration. The liquid overflow leaves the apparatus with the products. The nitrogen is then separated from the products by a screen located at the outlet of the device. The nitrogen thus recovered is recycled: it is collected in a reserve and returned by a piston pump to the treatment tank.

The nitrogen level is maintained substantially constant in the reserve using a valve actuated by a probe which measures the liquid nitrogen level.

Thus the nitrogen flows in a semi-closed circuit, only leaving the circuit by evaporation in contact with the products, and this nitrogen loss is permanently compensated for by the feed from the reserve. The products only pass through the tank once.

It must be emphasized that while this prior system has many advantages, it has drawbacks for certain products, essentially connected with the presence of the pump:

which represents the vulnerable element of the system: a pump which consumes a non-negligible quantity of compressed air and which, when the throughput of the products to be treated is very high, limits the total cooling capacity of the system by its pumping capacity;

the system also raises problems for small-sized products and powders: this is because the size of the product may become lower than the size of the openings of the screen and thereby circulate in a closed circuit with the nitrogen, which is obviously not satisfactory from the health standpoint and which could lead to holdup or clogging. Moreover, since these prior systems use a cryogenic liquid film, they represent an excessively lengthy, in other words excessively cold, treatment for such powders.

Nevertheless, extremely accurate control of the temperature of the powders is an essential factor for the success of such methods:

thus, if the powders are undercooled, they complete their crystallization process during their subsequent storage, without being subjected to any movement, incurring the risk of forming clusters, or even a properly sintered mass; and on the other hand, if the powders are overcooled (in any case beyond the necessary temperature), first, this represents superfluous power consumption, and second, the powders may be in a situation to condense water vapour present in the surrounding atmosphere, which would represent an undesirable factor for the end product.

Thus, very accurate control is clearly necessary, and it is understandable that such accurate control of the powder temperature proves to be a highly complicated task, because the throughputs of the products entering the system may vary considerably according to what happens upstream on the line, without forgetting the temperature of the incoming powders, which may also vary substantially.

As will be shown below, the present invention accordingly proposes an improved version of the vibrating support systems of the prior art, making them suitable for cooling the finest powders, including in the range from about 10 μm to 2 or 3 mm in size.

For this purpose, the essential features of the present invention can be summarized as follows:

a) the tunnel uses a vibrating support, and at least two independently controllable cryogenic liquid inflows into the system:

i) the first sprays cryogenic liquid on the support just upstream of the point where the powder is deposited on the support, thereby precooling the support, ensuring that the powder enters into contact with a very cold support and that no sticking occurs due to the temperature differences (moreover, the heat of the powder, when it subsequently arrives, causes evaporation of the cryogenic liquid thus predeposited, the cold gas thereby produced being a source of additional cooling of the powder) and j) the second consists of the use of at least one jet for spraying cryogenic liquid on the powders along their route in the equipment;

b) unlike the equipment of the prior art in this category, the method according to the present invention thus does not use a film or bath of cryogenic liquid that is transported by the vibrating support;

c) in a first step, the "thermal mass" of the product entering the equipment is determined. Depending on each case, various alternatives can be used to perform this step: for products at substantially constant temperature, the mass of product entering per unit of time (for example, via a signal of the upstream powder production machine, or by the fact that the powder passes over a conveyor belt section equipped with weight measurement means, in combination with the belt travel speed), and for products of which the temperature varies, the determination of the temperature of the entering products (thermocouple, infrared thermometer) in combination with a system for determining the mass flow rate of the entering product;

d) in the second step, the thermal mass measurement previously obtained is synchronized with the detection of the arrival of the product at the system inlet, according to a known or predefined response time of the means for controlling the cryogenic liquid inflows into the equipment.

The data is then transmitted to the overall equipment control system which can then retroact, on the basis of this data, on all or part of the parameters governing the operation of the equipment (extractions, injection rate of cryogenic liquid pre-cooling the vibrating support in the upstream part of the equipment, flow rate of subsequent sprays of cryogenic liquid on the product during its travel in the equipment, etc.);

e) in a third step, the overall control system effectively acts on the two types of jet, which are supplied via valves which are themselves controlled according to a measurement of the cryogenic liquid pressure, as obtained for example by a transducer positioned between the valve and the jets.

Upstream of the valves, the cryogenic liquid supply is controlled by the systems of valves and other phase separators, serving to ensure that the cryogenic liquid is supplied at a stable pressure and substantially in the form of a proper liquid (low two-phase content).

This serves to guarantee that by controlling the pressure of the cryogenic liquid sprays, controllable and reproducible flow rates are obtained, with a response time of not longer than a few seconds to obtain such conditions (3 seconds is a highly satisfactory result, for example). This speed of response serves to guarantee that the equipment can react rapidly and effectively to changes in thermal mass entering upstream; and f) in a fourth step, the powder leaves the equipment, through a screen for example, or through a static mixer. The powder temperature can be advantageously measured therein, and can thus provide the control system with additional data allowing, if necessary, fine-tuning of the control parameters of the cryogenic liquid jets.

The present invention accordingly relates to a method for cooling a powder, in a tunnel provided with a vibrating support, and with at least two independently controllable cryogenic liquid inflows into the tunnel:

i) the first spraying cryogenic liquid on the support upstream of a point where the powder is deposited on the support;

j) the second consisting of the use of at least one jet for spraying cryogenic liquid on the powders along their route in the tunnel; and comprising the following steps:

the thermal mass of powder entering the equipment is determined;

the arrival of powder at the tunnel inlet is detected;

the thermal mass measurement previously obtained is synchronized with the detection of the arrival of the powder at the tunnel inlet, according to a known or predefined response time of the means for controlling the said cryogenic liquid inflows into the tunnel;

this synchronization data is transmitted to a data acquisition and processing unit, which is able to retroact, if necessary, on the basis of this data, on all or part of the parameters governing the operation of the tunnel.

The method according to the invention can, moreover, adopt one or more of the following technical features:

depending on the content of the said data, the data acquisition and processing unit retroacts on one or the other or each of the said cryogenic liquid inflows in order to guarantee a powder temperature within a predefined range at the tunnel outlet;

the said inflows are supplied via valves, and the inflows are controlled by the data acquisition and processing unit by a retroaction on one or each valve according to a measurement of the pressure of cryogenic liquid prevailing between the valve and the jet corresponding to it;

the powder temperature is measured at the tunnel outlet;

the thermal mass of powder entering the equipment is determined by determining the mass of product entering per unit of time;

the thermal mass of powder entering the equipment is determined by a determination of the temperature of the incoming products in combination with a determination of the mass flow rate of incoming powder.

The single FIGURE below allows a better visualization of one embodiment of the invention, and shows the following elements in the FIGURE:

at 1 a schematic illustration of the vibrating support of the tunnel (here in a gently rising position, but other positionings can be feasible according to the product concerned and according to the flow rate of incoming product), supplied with powder 2;

the tunnel is provided here with two independently controllable cryogenic liquid inflows, here the liquid nitrogen inflows (via the valves 11 and 12):

i) the first—3—sprays cryogenic liquid via jets 31 on the support upstream of the point where the powder is deposited on the support;

j) the second—4—consists of the use of a jet 41 for spraying cryogenic liquid on the powders along their route in the tunnel;

5 represents a system for determining the "thermal mass" of product entering the equipment, here by the fact that the product passes on a conveyor belt section equipped with weight measuring means, data combined with the belt travel speed;

10 represents a data acquisition and processing unit, able to receive data of the thermal mass of product entering the equipment, to receive data of the detection of the arrival of powder at the tunnel inlet (probe 14), to synchronize the thermal mass data with the detection of the powder arrival at the tunnel inlet, according to a known or predefined response time of the means for controlling the inflows of cryogenic liquid in the tunnel, and able to retroact, if necessary, on the basis of this data, on all or part of the parameters governing the operation of the tunnel (extractions, injection rate 3, injection rate 4, etc.), in order to obtain a powder outlet temperature that conforms to a given specification, and particularly within a predefined temperature range; and advantageously, the installation is provided with a temperature probe 13, able to measure the powder temperature at the tunnel outlet, in order to supply the unit 10 with additional data for, if necessary, fine-tuning the control parameters of the cryogenic liquid jets.

According to a preferred embodiment of the invention, an operation is used based on a system of recipes, in which the tunnel control parameters are stored in the control unit for each type of product and situation (product, fat content, etc.).

Thus, for illustration, a recipe may comprise:
- an adjustment of the support slope;
- an adjustment of the vibration frequency of the vibrating support;
- an adjustment of tunnel precooling ("standby" mode) while awaiting the arrival of powder at the tunnel inlet.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for cooling a powder in a tunnel provided with a vibrating support and at least two independently controllable cryogenic liquid inflows into the tunnel, the method comprising:
   a) spraying, via a first independently controllable cryogenic liquid inflow, cryogenic liquid on the support upstream of a point where the powder is deposited on the support;
   b) spraying, via at least one jet of a second independently controllable cryogenic liquid inflow, cryogenic liquid on the powder along a route of the powder in the tunnel;
   and comprising the following steps:
   determining a thermal mass the powder entering the equipment;
   detecting an arrival of the powder at a tunnel inlet;
   synchronizing the thermal mass with the detection of the arrival of the powder at the tunnel inlet according to a known or predefined response time of a system of valves that control the cryogenic liquid inflows into the tunnel; and
   transmitting data from the synchronization step to a data acquisition and processing unit, which is able to retroact, if necessary, on the data, on all or part of parameters governing the operation of the tunnel.

2. The method for cooling a powder according to claim 1, further comprising the step of guaranteeing a powder temperature within a predefined range at a tunnel outlet by retroacting the data acquisition and processing unit on one or the other or each of the cryogenic liquid inflows depending on the data.

3. The method for cooling a powder according to claim 2, further comprising the step of controlling the liquid inflows by the data acquisition and processing unit by a retroaction on one or each valve in the system of valves according to a pressure measurement of the cryogenic liquid between the valve and a jet corresponding to the valve.

4. The method for cooling a powder according to claim 1, further comprising the step of measuring a powder temperature at a tunnel outlet.

5. The method for cooling a powder according to claim 1, wherein the step of determining the thermal mass of powder entering the equipment is performed by determining a mass of the powder entering per unit of time.

6. The method for cooling a powder according to claim 1, wherein the step of determining the thermal mass of powder entering the equipment is performed by determining a temperature of the powder entering the tunnel in combination with a determination of a mass flow rate of incoming powder.

* * * * *